US010097961B2

(12) United States Patent
Nuesmeyer et al.

(10) Patent No.: US 10,097,961 B2
(45) Date of Patent: Oct. 9, 2018

(54) GOLF SHOT DETECTION

(71) Applicant: Microsoft Technology Licensing, LLC, Redmond, WA (US)

(72) Inventors: Christopher Nuesmeyer, Renton, WA (US); Christopher I. Borowski, Bellevue, WA (US); Arkya Misha Dhar, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 132 days.

(21) Appl. No.: 14/993,686

(22) Filed: Jan. 12, 2016

(65) Prior Publication Data
US 2016/0354671 A1 Dec. 8, 2016

Related U.S. Application Data

(60) Provisional application No. 62/172,717, filed on Jun. 8, 2015, provisional application No. 62/172,718, filed on Jun. 8, 2015.

(51) Int. Cl.
*A63B 71/06* (2006.01)
*H04W 4/02* (2018.01)
(Continued)

(52) U.S. Cl.
CPC ......... *H04W 4/028* (2013.01); *A63B 71/0669* (2013.01); *G01S 19/19* (2013.01);
(Continued)

(58) Field of Classification Search
USPC .................................................... 700/91, 92
See application file for complete search history.

(56) References Cited

U.S. PATENT DOCUMENTS 5,511,789 A 4/1996 Nakamura
5,588,919 A 12/1996 Nakamura
(Continued)

FOREIGN PATENT DOCUMENTS

CN 103744531 A 4/2014
GB 2512380 A 10/2014
(Continued)

OTHER PUBLICATIONS

IPEA European Patent Office, Second Written Opinion Issued in PCT Patent Application No. PCT/US2016/032232, dated Jan. 23, 2017, WIPO, 4 Pages.
(Continued)

*Primary Examiner* — Pierre E Elisca
(74) *Attorney, Agent, or Firm* — Alleman Hall Creasman & Tuttle LLP

(57) ABSTRACT

A wearable computing device comprises one or more motion sensors, a first circuit, and a second circuit. The one or more motion sensors are configured to measure swing motion. The first circuit is in communication with the one or more motion sensors and configured to translate measurements of the swing motion to machine-readable motion data and identify from the machine-readable motion data a golf shot in which a golf club held by a golfer contacts a golf ball. The second circuit is configured to increment a golf score of the golfer responsive to the golf shot being identified.

20 Claims, 8 Drawing Sheets

(51) Int. Cl.

| | | |
|---|---|---|
| *H04B 1/3827* | (2015.01) | |
| *H04W 52/02* | (2009.01) | |
| *G01S 19/34* | (2010.01) | |
| *G01S 19/19* | (2010.01) | |
| *H04M 1/725* | (2006.01) | |
| *H04W 4/029* | (2018.01) | |
| *H04W 4/70* | (2018.01) | |

(52) U.S. Cl.
CPC .............. *G01S 19/34* (2013.01); *H04B 1/385* (2013.01); *H04M 1/7253* (2013.01); *H04W 4/029* (2018.02); *H04W 4/70* (2018.02); *H04W 52/0254* (2013.01); *A63B 2220/44* (2013.01); *H04M 2250/10* (2013.01); *Y02D 70/00* (2018.01); *Y02D 70/144* (2018.01); *Y02D 70/164* (2018.01); *Y02D 70/26* (2018.01)

(56) References Cited

U.S. PATENT DOCUMENTS

| | | | |
|---|---|---|---|
| 5,688,183 | A | 11/1997 | Sabatino et al. |
| 5,827,126 | A | 10/1998 | Lee |
| 5,895,326 | A | 4/1999 | Cozza et al. |
| 8,123,624 | B2 | 2/2012 | Caldwell |
| 8,986,129 | B2 | 3/2015 | Miettinen et al. |
| 2007/0275826 | A1 | 11/2007 | Niemimaki et al. |
| 2008/0300055 | A1 | 12/2008 | Lutnick et al. |
| 2011/0054782 | A1 | 3/2011 | Kaahui |
| 2014/0055352 | A1 | 2/2014 | Davis et al. |
| 2014/0221114 | A1 | 8/2014 | Woody |
| 2015/0032237 | A1* | 1/2015 | Roebke .............. G06K 9/00342 700/92 |
| 2016/0320476 | A1* | 11/2016 | Johnson .................... G06T 7/80 |
| 2017/0043228 | A1* | 2/2017 | Hunter ............... G06K 19/0723 |
| 2017/0142329 | A1* | 5/2017 | Pelz .................. H04N 5/23219 |
| 2017/0274256 | A1* | 9/2017 | Brekke .................. A63B 60/42 |

FOREIGN PATENT DOCUMENTS

| | | |
|---|---|---|
| WO | 2012125878 A2 | 9/2012 |
| WO | 2013138381 A2 | 9/2013 |

OTHER PUBLICATIONS

Bonnington, Christina, "Garmin's New Golf Watch Willi Teach You How to Swing Better", Published on: Jun. 9, 2014, Available at: http://www.wired.com/2014/06/garmin-approach-s6-golf-watch/.

ISA European Patent Office, International Search Report and Written Opinion Issued in PCT Application No. PCT/US2016/032232, dated Sep. 27, 2016, WIPO, 10 pages.

"International Preliminary Report on Patentability Issued in PCT Application No. PCT/US2016/032232", dated Sep. 27, 2017, 6 Pages.

* cited by examiner

US 10,097,961 B2

GOLF SHOT DETECTION

CROSS REFERENCE TO RELATED APPLICATIONS

This application claims priority to U.S. Patent Application No. 62/172,717, filed on Jun. 8, 2015, and U.S. Patent Application No. 62/172,718, filed on Jun. 8, 2015, the entirety of each of which are hereby incorporated herein by reference.

BACKGROUND

In the game of golf, a golfer may keep score manually by writing down a total number of golf shots or strokes taken on a hole after the golfer has completed the hole. The manual scoring process may be repeated as the golfer completes each hole during a round of golf.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A wearable computing device comprises one or more motion sensors, a first circuit, and a second circuit. The one or more motion sensors are configured to measure swing motion. The first circuit is in communication with the one or more motion sensors and is configured to translate measurements of swing motion to machine-readable motion data and identify from the machine-readable motion data a golf shot in which a golf club held by a golfer contacts a golf ball. The second circuit is configured to increment a golf score of the golfer responsive to the golf shot being identified.

DETAILED DESCRIPTION

Figure 1:
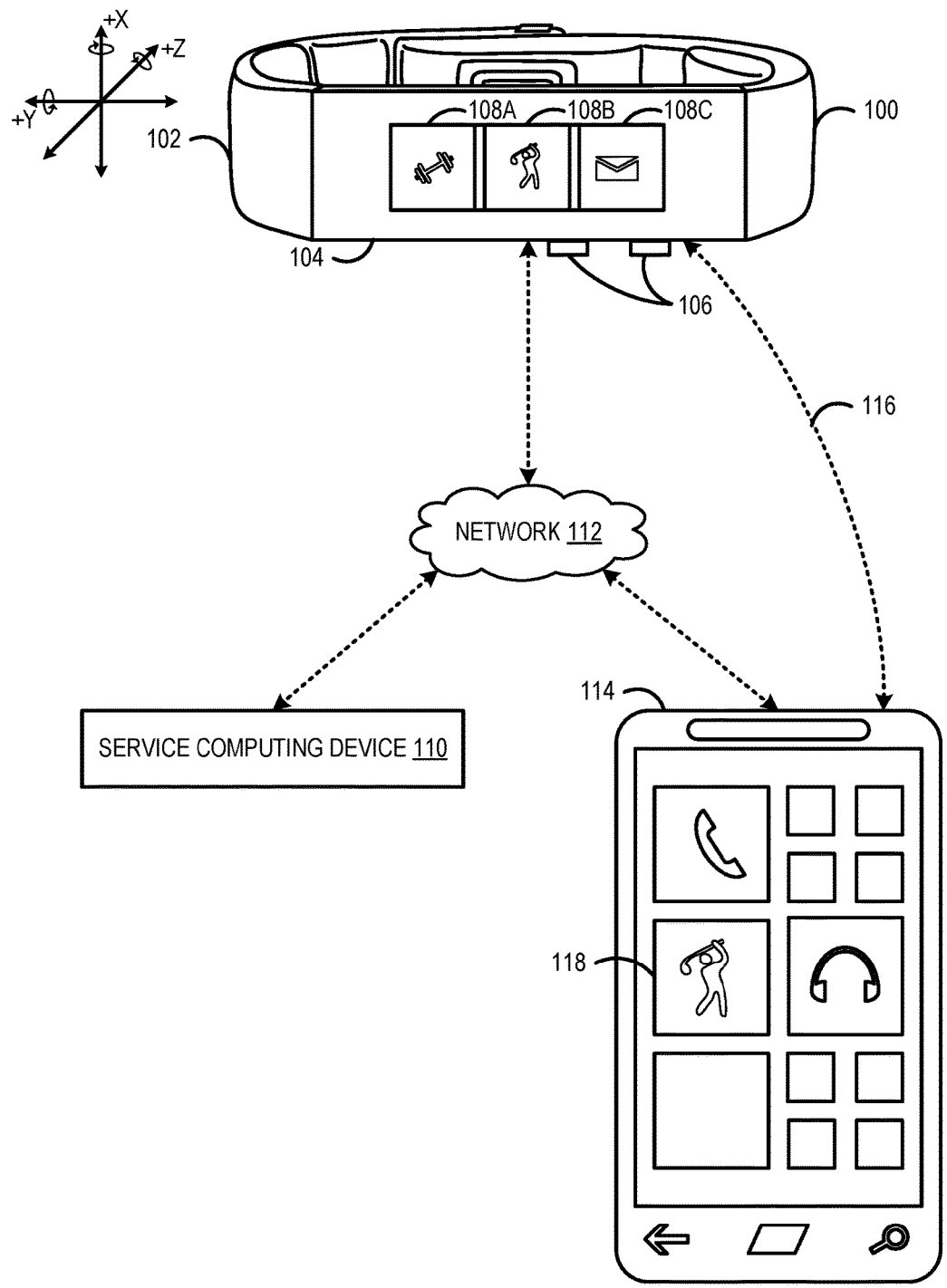
FIG. 1 shows an example golf computing environment including a wearable computing device, a mobile computing device, and a service computing device.

A golfer may keep score manually by writing down a total number of golf shots or strokes taken on a hole after the golfer has completed the hole. Alternatively, a golfer's score can be automatically tracked in real-time during a round of golf via sensor-based golf shot detection. In one example approach, a sensor device is attached to a golf club to record motion data of the golf club during a golf swing. The sensor device sends the motion data to a mobile computing device (e.g., a smartphone) via wireless communication (e.g., Bluetooth). The mobile computing device analyzes the motion data to determine whether a golf shot has occurred to automatically keep score for the golfer. For example, the smartphone may present the score to the golfer via a display in real-time.

In such an approach, the addition of the sensor device on the golf club changes the weight and feel of the golf club. Typically, such a change negatively affects the golfer's golf swing. Also, because the sensor device constantly sends motion data to the smartphone, a wireless receiver of the smartphone is continuously consuming battery power of the smartphone. Accordingly, such an approach rapidly drains the battery of the smartphone.

Furthermore, in such an approach, the golfer is required to have a sensor device for each golf club that the golfer intends to use while playing a round of golf. Such a large number of sensor devices needed to outfit a set of golf clubs is a costly expenditure for the golfer. Alternatively, the golfer could move a single sensor device between different golf clubs each time the golfer takes a shot. However, the repeated installation of the sensor device on different golf clubs is cumbersome and makes the experience of playing golf less enjoyable for the golfer.

Accordingly, the present description is directed to a wearable computing device configured to automatically keep tracking of a golfer's golf score. More particularly, the wearable computing device includes one or more motion sensors configured to translate swing motion to machine-readable motion data. For example, the wearable computing device may be a wrist-worn computing device, and the one or more motion sensors may be configured to track linear and/or angular acceleration of the golfer's wrist in one or more axes. The wearable computing device includes a machine-learning golf shot detection machine configured to identify from the machine-readable motion data a golf shot in which a golf club held by the golfer contacts a golf ball. The machine-learning golf shot detection machine may be previously trained with training motion data of previously-executed golf swings. The wearable computing device includes a score-keeping machine configured to increment a golf score of the golfer responsive to the machine-learning golf shot detection machine identifying the golf shot.

By detecting swing motion of the golfer using motion sensors included in the wearable computing device positioned on the golfer's wrist, the golfer's score may be automatically tracked in a manner that does not significantly affect or otherwise interfere with the golfer's golf swing. In other words, the wearable computing device does not interact with the golfer's golf club in any way, and thus does not change the weight and feel of the golf club. Moreover, the wearable computing device can automatically keep track of the golfer's score without requiring any wireless communication with a remote computing device (e.g., smartphone) during a round of golf. Accordingly, battery charge of the wearable computing device and/or the golfer's smartphone is not reduced due to communication between the two devices during the round of golf.

FIG. 1 shows an example wearable computing device 100. Wearable computing device 100 is a wrist-worn computing device that includes a wrist band 102 and a display 104. Wrist band 102 is configured to be wrapped around a wrist of a user to secure the wearable computing device 100 to the user's wrist. Display 104 is configured to visually present information related to a variety of different application programs executable by wearable computing device 100. Display 104 may employ any suitable type of display technology. In some implementations, display 104 includes a touch-screen sensor configured to receive touch input from the user. As examples, the touch sensor may be resistive, capacitive, or optically based. In some implementations, wearable computing device 100 includes push buttons 106, which may include rockers. User input from push buttons 106 may be used to initiate various operations, such as displaying a home-screen, enacting an on-off feature, controlling audio volume, visually presenting and/or executing different application programs, performing application-specific operations, visually presenting application-specific information, and other computing operations.

Wearable computing device 100 may be configured to execute different application programs 108 (e.g., represented by tiles 108A, 108B. 108C) related to different activities. In the illustrated implementation, application program 108A is an exercise application program to track exercise routines, application program 108B is a golf application program to automatically track a golf score and provide other golf-related information to a golfer, and application program 108C represents an email application. In one example, a user may swipe left or right along display 104 to scroll through different tiles representing different application programs executable by wearable computing device 100. Further, the user may tap a particular tile to execute a corresponding application program.

Wearable computing device 100 may be configured to execute any suitable number of different application programs related to different activities. In some implementations, various application programs may be pre-loaded onto wearable computing device 100 by a manufacturer of wearable computing device 100. In some implementations, various application programs can be downloaded to wearable computing device 100 via communication with a remote computing device. Wearable computing device 100 may communicate with a service computing system (e.g., a virtual marketplace) 110 via a network 112, such as the Internet. In particular wearable computing device 100 may download an application program from service computing device 110. For example, a user may browse through a plurality of different application programs available for download on a virtual marketplace, and select a desired application program to be downloaded to wearable computing device 100.

Furthermore, wearable computing device 100 may communicate with a mobile computing device (e.g., a smartphone) 114. In one example, wearable computing device 100 communicates with mobile computing device 114 via a direct connection 116 (e.g., Bluetooth). In such an example, wearable computing device 100 may lack wide-area network connectivity capabilities. In another example, wearable computing device 100 does have wide-area network connectivity and communicates with mobile computing device 114 via network 112 (e.g., the Internet).

In some implementations, wearable computing device 100 may download an application program from mobile computing device 114. In some implementations, mobile computing device 114 may act as an intermediary device between service computing device 110 and wearable computing device 100. In some implementations, mobile computing device 114 may provide supplemental resources (e.g., processing, visual presentation, connectivity) to wearable computing device 100 to enhance execution of various application programs by wearable computing device 100. For example, wearable computing device 100 may have limited display, processing, connectivity, and/or power (e.g., battery) capabilities relative to mobile computing device 114. Accordingly, in some cases, mobile computing device 114 may perform various application-specific operations on behalf of wearable computing device 100.

In the illustrated example, mobile computing device 114 is configured to execute a companion golf application program 118 that cooperates with the golf application program 108B executed by wearable computing device 100. In particular, companion golf application program 118 may present supplemental golf information related to a golfer and/or a golf course. Such supplemental golf-related information may be referenced by the golfer before and/or after a round of golf. For example, companion golf application program 118 may visually present detailed golf course feature maps that may not be able to be visually presented with sufficient detail by display 104 of wearable computing device 100. In another example, companion golf application program 118 may track statistics for a golfer on a long-term basis (e.g., across multiple rounds of golf) that would consume substantial storage resources of wearable computing device 100. In some implementations, companion golf application program 118 alternatively or additionally may be executed by service computing device 110. For example, companion golf application program 118 may be a web application accessible via a web browser.

In some implementations, wearable computing device 100 may have processing, display, and other computing resources sufficient to present golf-related information without companion golf application program 118. In other words, the functionality provided by companion golf application program 118 may instead be provided by golf application program 108B.

In one example in which wearable computing device 100 is used as a golf assistant computing device to track golf-related information during a round of golf, the golfer may select the tile corresponding to golf application program 108B to initiate execution of golf application program 108B. Next, the golfer may select, via mobile computing device 114, a desired golf course where the round of golf will be played or the golf application program 108B infers the golf course based on current location and/or information saved in a calendar application. Golf course data for the desired golf course is acquired by wearable computing device 100 responsive to the selection of the golf course. For example, golf course data may include hole lengths for different tee locations, pars, slope ratings, GPS locations of different golf course features (e.g., front/middle/back of greens, bunkers, water hazards, and tee boxes) and/or other golf course information. Once the golf course data has been downloaded to wearable computing device 100, the golfer may proceed with playing the round of golf.

In some implementations, wearable computing device 100 may have communication, processing, storage, and other computing resources sufficient to receive, store, and present golf course data without having to download the golf course data from mobile computing device 114. In some implementations, wearable computing device 100 may receive golf course data directly from service computing device 110. In some implementations, wearable computing device 100 may store golf course data for some or all available golf courses.

Wearable computing device 100 may be configured to automatically track a golf score of the golfer based on the golfer's swing motion. For example, swing motion may be determined by motion sensors of wearable computing device 100 that may be configured to determine position and/or orientation data of wearable computing device 100. In the illustrated implementation, swing motion of wearable computing device 100 is determined along six-axes or six-degrees of freedom (6 DOF). In particular, a position about three orthogonal spatial axes (e.g., X, Y, and Z) and an orientation about three orthogonal rotation axes (e.g., yaw, pitch, and roll) of wearable computing device 100 may be determined by motion sensors of wearable computing device 100. Wearable computing device 100 may identify, from the swing motion, a golf shot in which a golf club held by the golfer contacts a golf ball. Further wearable computing device 100 may be configured to increment a golf score of the golfer responsive to the golf shot being identified. Such automatic golf score keeping will be described in further detail below with reference to FIGS. 6-8.

Wearable computing device 100 may visually present the golf score of the golfer as well as other golf-related information via display 104. For example, golf-related information may include a current hole, a current golf score, relevant distances, relevant elevations, and other suitable golf-related information. In some implementations, wearable computing device 100 may be configured to automatically visually present golf-related information via display 104 without user input from the golfer. In some implementations, wearable computing device 100 may be configured to visually present golf-related information via display 104 responsive to user input to wearable computing device 100. In one example, the golfer may press one of push buttons 106 to visually present a distance to a current green. In another example, the golfer may press the other one of push buttons 106 to visually present a current total golf score for the round and a current total score over/under par. Wearable computing device 100 may be configured to visually present any suitable golf-related information in any suitable manner.

Figure 2:
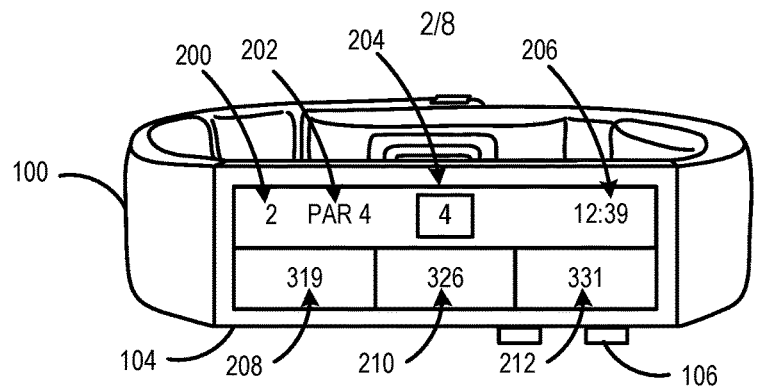
FIG. 2 shows the wearable computing device of FIG. 1 visually presenting a golfer's golf score.

FIG. 2 shows an example scenario in which display 104 of wearable computing device 100 visually presents golf-related information during a round of golf. In particular, display 104 visually presents a current hole 200, a par 202 for the current hole, a current golf score 204, a current time 206, a current distance to a front of the current green 208, a current distance to a middle of the current green 210, and a current distance to a back of the current green 212. In the illustrated example, the current hole is the 2$^{nd}$ hole, the current par is 4, the current golf score is 4, the current time is 12:39 PM, the current distances to the front/middle/back of the green are 319/326/331 yards.

In some implementations, the golf-related information may be visually presented and updated without user input. Wearable computing device 100 may be configured to automatically update the current hole 200 and the par 202 for the current hole responsive to a new hole being detected based on a location of the golfer, among other relevant information. Similarly, wearable computing device 100 may automatically update the distances to the different parts of the current green.

In some implementations, at least some of the golf-related information may be visually presented/updated responsive to user input. For example, wearable computing device 100 may be configured to visually present the hole distances 208, 210, 212 via display 104 responsive to receiving user input via push button 106. In one example, wearable computing device 100 may visually present the hole distances for a designated duration. In another example, wearable computing device 100 may visually present the hole distances until the hole distances change or are no longer accurate (e.g., due to a change in position of the golfer).

Figure 3:
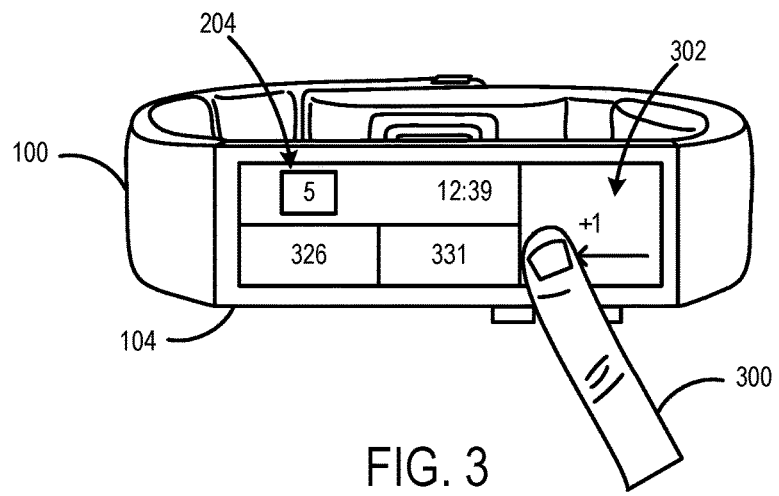
FIG. 3 shows an example scenario where a golfer's golf score is manually increased via touch input to a display of the wearable computing device of FIG. 1.
Figure 4:
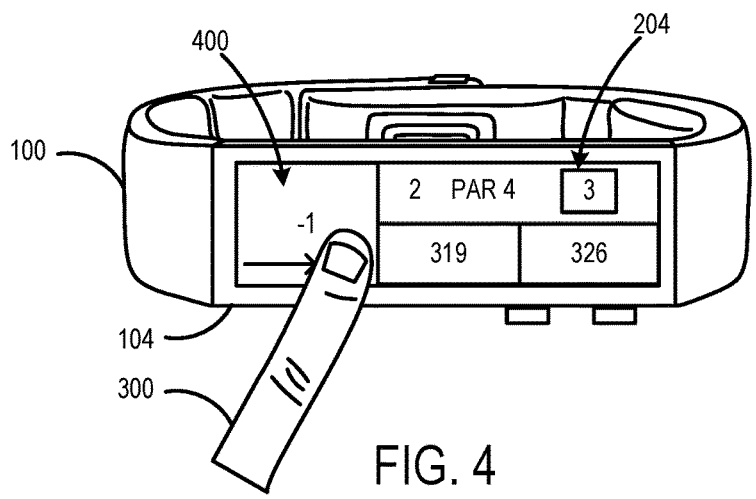
FIG. 4 shows an example scenario where a golfer's golf score is manually decreased via touch input to a display of the wearable computing device of FIG. 1.

Furthermore, wearable computing device 100 may automatically update the current golf score 204 responsive to detection of a golf shot. Additionally, wearable computing device 100 may update the current golf score 204 responsive to a manual change via user input. FIGS. 3-4 show different example scenarios of wearable computing device 100 manually adjusting the current golf score 204 responsive to user input. In these example scenarios, the current golf score is 4 as shown in FIG. 2.

In one example shown in FIG. 3, the golfer swipes a finger 300 leftward across display 104. Wearable computing device 100 recognizes the touch input as an increment golf score gesture, and updates the current golf score from 4 to 5 responsive to recognizing the increment golf score gesture. Further, wearable computing device 100 visually presents an increment golf score indicator 302 via display 104 responsive to recognizing the increment golf score gesture. The increment golf score indicator 302 may provide visual feedback to the golfer indicating that the golfer is manually increasing the golf score 204.

In another example shown in FIG. 4, the golfer swipes the finger 300 rightward across display 104. Wearable computing device 100 recognizes the touch input as a decrement golf score gesture, and updates the current golf score from 4 to 3 responsive to recognizing the decrement golf score gesture. Further, wearable computing device 100 visually presents a decrement golf score indicator 400 via display 104 responsive to recognizing the decrement golf score gesture. The decrement golf score indicator 400 may provide visual feedback to the golfer indicating that the golfer is manually decreasing the golf score 204.

The golfer may desire to manually adjust the golf score 204 for various reasons separate from automatically detecting golf shots and in accordance with the rules of golf. In one example, a golfer manually increments the golf score 204 to account for penalty strokes, such as due to hitting a ball out-of-bounds or into a water hazard. In another example, a golfer manually decrements the golf score 204 to account for taking a mulligan. The golf score 204 may be manually adjusted for any suitable reason.

Wearable computing device 100 may visually present and update any suitable golf-related information as the round of golf is played by the golfer.

Furthermore, in response to completion of the round of golf (or upon exit of golf application program 108B), wearable computing device 100 visually presents a summary of golf-related information for the round via display 104. Completion of the round of golf may be determined in any suitable manner. In one example, the golfer provides user input to wearable computing device 100 manually indicating the round of golf is completed. In another example, the golfer specifies a desired number of holes in the round (e.g., 9, 18, 36), and upon completion of the desired number of holes, wearable computing device 100 may automatically determine that the round of golf is completed. In another example, wearable computing device 100 may determine the round is completed responsive to the current location of the golfer being greater than a threshold distance from a final green after the golfer had been located on the final green. For example, if the golfer walks to the clubhouse after the 18$^{th}$ hole, then wearable computing device 100 may determine that the golfer has moved a sufficient distance away from the green, and determines that the round of golf is completed.

Figure 5:
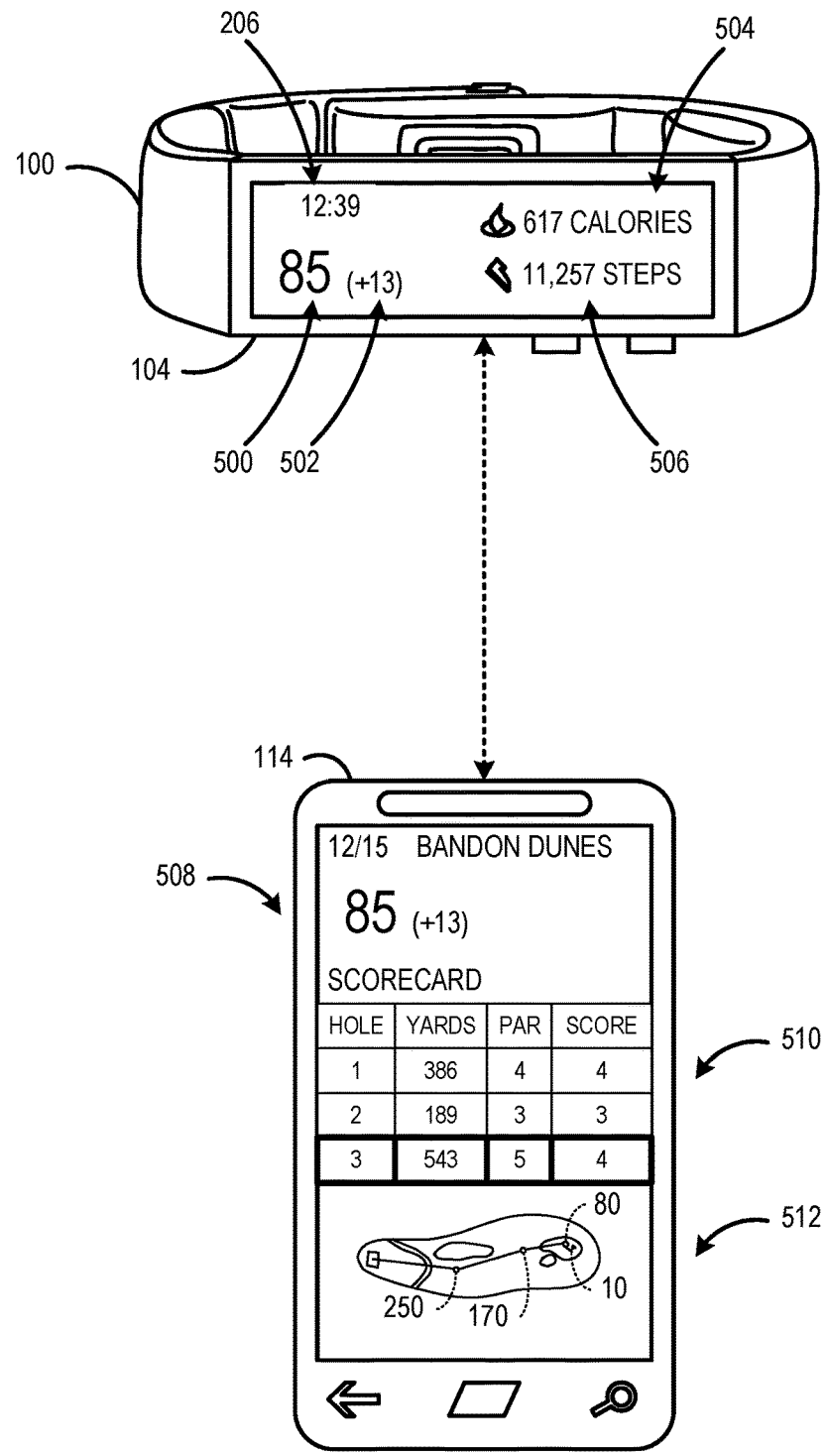
FIG. 5 shows the wearable computing device and the mobile computing device of FIG. 1 visually presenting golfer-related information collected by the wearable computing device during a round of golf.

FIG. 5 shows an example scenario in which display 104 of wearable computing device 100 visually presents an example summary of golf-related information at the conclusion of a round of golf. In particular, display 104 visually presents the current time 206, a total golf score 500 for the round of golf, a total score over par 502 for the round of golf, a number of calories 504 burned during the round of golf, and a number of steps 506 taken during the round of golf. In the illustrated example, the total golf score is 85, the total score over part is +13, the number of calories burned is 617, and the total number of steps is 11,257.

Furthermore, upon conclusion of the round of golf, wearable computing device 100 may send golf-related information tracked by wearable computing device 100 during the round of golf to mobile computing device 114. For example, golf-related information may include a position and distance of each golf shot, a number of drives/chips/putts for each hole, a total number of drives/chips/putts for the round of golf, a golf score for each hole, a total golf score, a number of steps for each hole, a total number of steps for the round of golf, a total distance traveled for the round of golf, a number of calories burned for each hole, and a total number of calories burned for the round of golf. Wearable computing device 100 may send any suitable golf-related information to mobile computing device 114. In some implementations, wearable computing device 100 additionally or alternatively may send golf-related information to service computing device 110.

Mobile computing device 114 may visually present the golf-related information received from wearable computing device 100 via companion golf application program 118. In the illustrated example, mobile computing device 114 visually presents the total golf score 508, a scorecard 510 including hole-by-hole scoring, and a shot map 512 including a position and distance of each golf shot taken by the golfer for a selected hole of the golf course. Mobile computing device 114 may visually present any suitable golf-related information. In some implementations, mobile computing device 114 may visually present golf-related information for a golfer accumulated over multiple rounds of golf. For example, mobile computing device 114 may track and visually present a handicap of the golfer, an average drive distance, an average number of putts per hole, and other cumulative golf statistics.

Although wearable computing device 100 may communicate with mobile computing device 114 before and/or after a round of golf, wearable computing device 100 is configured to automatically keep track of the golfer's golf score during the round of golf without communicating with the mobile computing device 114 and service computing device 110. Accordingly, wearable computing device 100 may not reduce a battery state of charge due to score-keeping communication with mobile computing device 114 during the round of golf and vice versa.

In some implementations, wearable computing device 100 may have processing, storage, display, and other computing resources sufficient to present golf-related information without support from mobile computing device 114. In other words, the functionality provided by mobile computing device 114 may instead be provided by wearable computing device 100.

Figure 6:
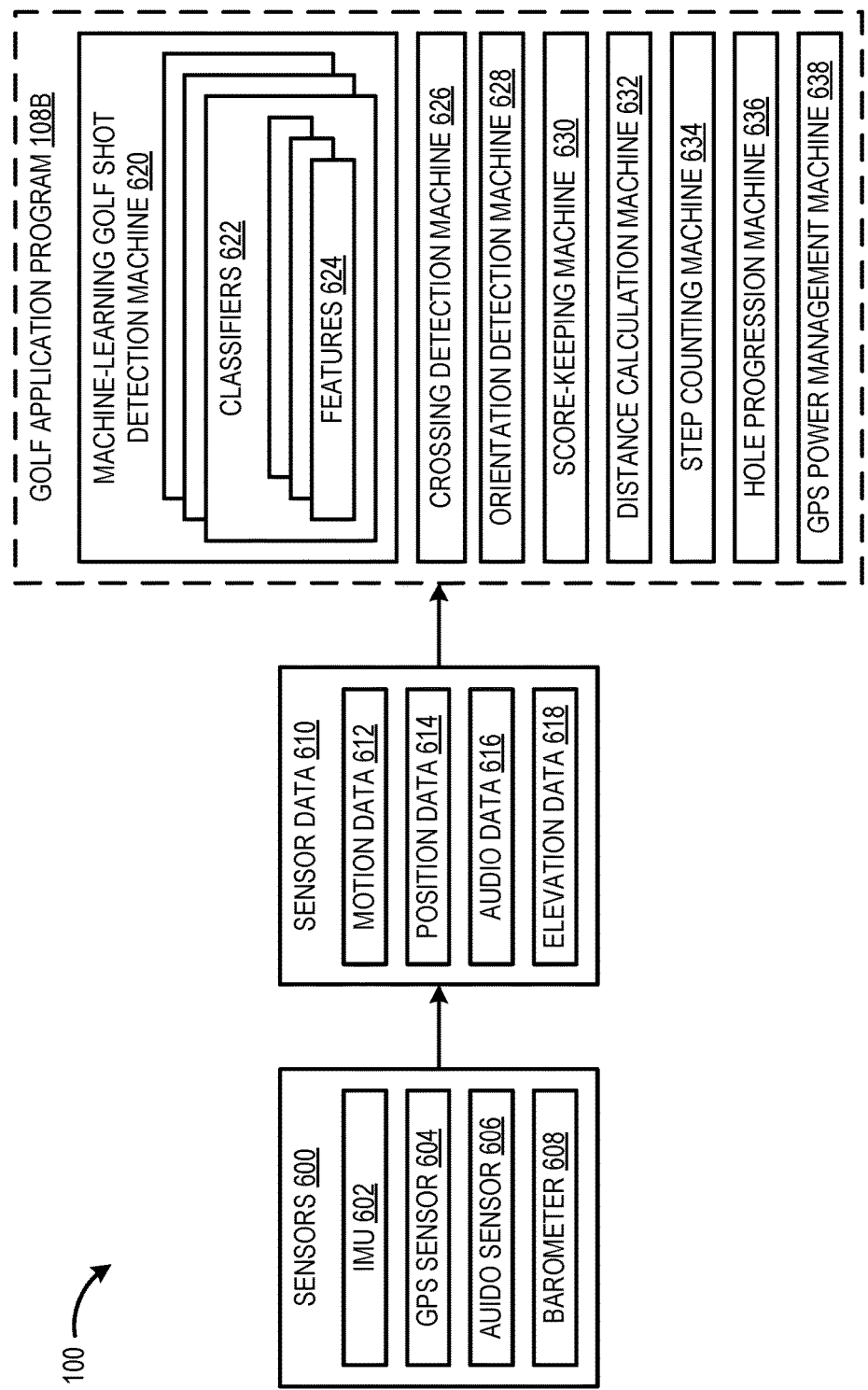
FIG. 6 schematically shows a computer architecture diagram of an example wearable computing device.

FIG. 6 shows an example computer architecture diagram of computing components of wearable computing device 100 that collectively enable the functionality of golf application program 108B described above. In particular, wearable computing device 100 includes a plurality of sensors 600 configured to translate different physical parameters into machine-readable sensor data 610 that is provided as input to a plurality of different operation-specific machines configured to collectively track, generate, and visually present the above described golf-related information as well as provide other golf-related functionality described herein. As used herein, "machine" means physical data-storage and processing circuit(s) and/or other hardware programmed with instructions to perform specialized computing operations. It is to be understood that two or more different circuits and/or other machines may share hardware components. For example, the same integrated circuit may be part of two or more different machines programmed to perform different functions. As used herein, "first," "second," and other identifiers may be used to refer to the same circuit and/or other machine.

In the illustrated implementation, the plurality of sensors 600 include an inertial measurement unit (IMU) 602, a global position system (GPS) sensor 604, one or more audio sensors 606, and one or more barometers 608. IMU 602 may be configured to provide position and/or orientation data of wearable computing device 100. In one example implementation, IMU 602 may be configured as a six-axis or six-degree of freedom (6 DOF) position sensor system. Such a configuration may include three accelerometers and three gyroscopes to indicate or measure a change in position of wearable computing device 100 about three orthogonal spatial axes (e.g., x, y, and z) and a change in orientation about three orthogonal rotation axes (e.g., yaw, pitch, and roll). IMU 602 may be configured to translate swing motion of the golfer to machine-readable motion data 612.

GPS sensor 604 may be configured to determine a geographical location of wearable computing device 100 via communication with a GPS satellite network. Further, GPS sensor 604 may be configured to translate the geographical location into machine-readable position data 614. GPS sensor 604 may be configured to switch between a high power state and a lower power state according to a power state duty cycle that defines a percentage of a period in which GPS sensor 604 operates in the high power state relative to the lower power state.

One or more audio sensors 606 may be configured to capture sounds of the physical environment surrounding wearable computing device 100. For example, the one or more audio sensors 606 may capture sound of a swing motion of the golfer and/or sound of contact between the golf club and the golf ball. As another example, audio sensors 606 may capture the sound of a golf club hitting the ground and not the ball. Further, the one or more audio sensors 606 may be configured to translate the sound of the swing motion of the golfer the contact between the golf club and the golf ball, and/or the contact between the golf club and the ground to machine-readable audio data 616.

Barometer 608 may be configured to measure atmospheric pressure at the location of wearable computing device 100. Further, barometer 608 may be configured to translate the atmospheric pressure to machine-readable elevation data 618. In implementations that include two barometers, the two barometers may act as a speed sensor that translate swing motion to a speed data that wearable computing device 100 may use to track a golfer's swing speed during different golf swings.

While specific examples of sensors have been described, wearable computing device 100 may include any other suitable sensors for tracking golf-related information of a golfer. For example, wearable computing device 100 may include visible-light sensors, ultraviolet sensors, ambient temperature sensors, contact sensors, optical heart rate sensors, and other sensors for measuring a physical condition of the golfer. Such sensors may measure any suitable physical parameter. Further, such sensors may be in communication with one or more circuits or other machines configured to translate measurements of the physical parameters into machine-readable sensor data 610.

The plurality of machines may use the machine-readable sensor data 610 to perform operations that enable functionality of the golf application program 108B. In the illustrated implementation, the plurality of machines include a machine-learning golf shot detection machine 620, a crossing detection machine 626, an orientation determination machine 628, a score-keeping machine 630, a distance calculation machine 632, a step counting machine 634, a hole progression machine 636, and a GPS power management machine 638.

Machine-learning golf shot detection machine 620 may be configured to identify from machine-readable motion data 612 a golf swing. Further, machine-learning golf shot detection machine 620 may be configured to identify from machine-readable motion data 612 a golf shot in which a golf club held by the golfer contacts a golf ball. More particularly, machine-learning golf shot detection machine 620 may include a plurality of different swing detection and contact detection classifiers 622. Each swing detection classifier may be configured to identify a different type of golf swing. Each contact detection classifier may be configured to identify a golf shot (i.e., contact of a club with a golf ball) for different swing magnitudes. Each classifier 622 may be a neural network including a different set of features 624. Each set of features 624 may include individual, measurable properties derived from the machine-readable motion data 612 that define a particular type of golf swing or golf shot. Each set of features 624 may be created from a different combination of transformations to motion data samples windowed around crossings of angular acceleration of one or more gyroscopes of IMU 602. Such crossings may occur from positive to negative or negative to positive angular acceleration. In other words, each set of features 624 may be created using data samples within a different fixed window that is set relative to a time at which one or more crossings occur. Classifiers 622 of machine-learning golf shot detection machine 620 will be discussed in further detail below with reference to FIG. 7.

Machine-learning golf shot detection machine 620 may be previously trained with training motion data of previously-executed golf swings. More particularly, each classifier 622 may be previously trained with training motion data of previously-executed golf swings of a particular type that corresponds to the particular classifier. For example, a drive swing detection classifier may be previously trained with training motion data of previously-executed drive swings (e.g., typically using a driver club).

In some implementations, machine-learning golf shot detection machine 620 may be configured to identify a golf swing and/or a golf shot from machine-readable audio data 616 provided from audio sensor 606. Such swing/shot detection may be made based on audio data 616 alone or in combination with motion data 612. In such implementations, machine-learning golf shot detection machine 620 may be previously trained with training audio data of previously-executed golf swings/golf shots.

In some implementations, machine-learning golf shot detection machine 620 may be configured to disallow or ignore various swing or shot detections based on a location of wearable computing device 100 determined via GPS sensor 604. For example, when a distance from the location of wearable computing device 100 to a portion of a green of a current hole is greater than a threshold distance, machine-learning golf shot detection machine 620 may ignore all detections of putt swings and putt shots. According to such an approach, machine-learning golf shot detection machine 620 may filter out false positive detections of swings and shots. Moreover, such an approach may be extended to other types of swings and shots having different distance thresholds and/or other false positive identification parameters.

Crossing detection machine 626 may be configured to identify one or more crossings between negative and positive angular acceleration of one or more gyroscopes of IMU 602. A crossing of at least one gyroscope occurs on almost all golf swings, and thus provides a reliable indication that a golf swing is potentially taking place. As such, machine-learning golf shot detection machine 620 may be configured to execute one or more swing detection classifiers 624 in response to crossing detection machine 626 identifying at least one gyroscope crossing. In other words, crossing detection machine 626 may trigger machine-learning golf shot detection machine 620 to run one or more classifiers for identifying a golf swing. In one example, in response to crossing detection machine 626 identifying two crossings of two different gyroscopes, machine-learning golf shot detection machine 620 may execute a drive swing detection classifier and a chip swing detection classifier. Further, in response to crossing detection machine 626 identifying a crossing of at least one gyroscope, machine-learning golf shot detection machine 620 may execute a putt swing detection classifier. By triggering execution of the different classifiers based on crossings identified by crossing detection machine 626, the classifiers may be executed less frequently relative to an approach where classifiers are continuously executed on motion data. According to such an approach, processing resources of wearable computing device 100 may be operated in a more efficient manner that conserves battery power of wearable computing device 100.

Orientation detection machine 628 may be configured to determine an orientation of wearable computing device 100. The orientation of wearable computing device 100 may be used by machine-learning golf shot detection machine 620 as a reference when interpreting machine-readable motion data 612 generated from swing motion. In implementations where wearable computing device 100 is a wrist-worn device, wearable computing device 100 may be worn in one of four different orientations. The four orientations include left wrist with the display facing outward, left wrist with the display facing inward, right wrist with the display facing outward, and right wrist with the display facing inward.

In some implementations, orientation detection machine 628 may be configured to automatically determine an orientation of wearable computing device 100. In one example, orientation detection machine 628 applies four different mathematical transformations to machine-readable motion data 612 generated from a swing motion. The four different mathematical transformations correspond to the four supported orientations of wearable computing device 100. In one example, machine-readable motion data 612 may be mathematically transformed to match what would be seen if the band is worn on the left-inside with the display facing inwards (the most common orientation in which wearable computing device 100 is worn). Orientation detection machine 628 commands machine-learning golf shot detection machine 620 to execute drive swing detection classifier four times using the four transformations of machine-readable motion data 612. Orientation detection machine 628 selects an orientation corresponding to whichever mathematical transformation of machine-readable motion data 612 produces the highest confidence of a swing detection from the drive swing detection classifier.

In some implementations, the orientation detection machine 628 detects an orientation of wearable computing device 100 by prompting the golfer to provide a manual indication of orientation via user input. For example, orientation detection machine 628 may prompt the golfer to select one of the four supported orientations upon startup of golf application program 108B.

Once the orientation of wearable computing device 100 is determined, orientation detection machine 628 may apply the mathematical transformation corresponding to the selected orientation to machine-readable motion data 612 generated from every swing. By mathematically transforming machine-readable motion data 612 according to the detected orientation, a single type of swing classifier can be used to identify a swing regardless of device orientation. By reducing the number of classifiers that are executed to identify a golf swing, machine training may be simplified. Alternatively, the orientation of wearable computing device 100 may not be considered, and instead machine-learning golf shot detection machine 620 may include four orientation-specific classifiers for each type of swing.

Score-keeping machine 630 may be configured to increment the golf score of the golfer during a round of golf responsive to machine-learning golf shot detection machine 620 identifying a golf shot. Further, score-keeping machine 630 may be configured to adjust the golf score of the golfer for a round of golf, responsive to wearable computing device 100 receiving user input indicating a manual change of the golf score, such as a decrement golf score gesture or an increment golf score gesture.

In some implementations, score-keeping machine 630 may be configured to recognize a golf shot grouping session. A golf shot grouping session may be a designated window of time in which only one golf shot is counted toward a golf score regardless of how many golf swings or golf shots are detected by machine-learning golf shot detection machine 620. In one example, score-keeping machine 630 may recognize a golf shot grouping session responsive to detecting an initial golf swing or golf shot in a window. In another example, score-keeping machine 630 may be configured to initiate a golf shot grouping session responsive to identifying a golf swing having a swing speed greater than a threshold speed. For example, when a golfer is a threshold distance (e.g., far enough to use a full swing) away from a green, swings having slower speeds may be classified as practice swings and may be grouped within a shot grouping session. A swing speed parameter may be utilized to determine a shot grouping session in any suitable manner. In some implementations, score-keeping machine 630 may be configured to extend a duration of the golf shot grouping session each time machine-learning golf shot detection machine 620 identifies an additional golf swing.

Furthermore, score-keeping machine 630 may be configured to end the golf shot grouping session responsive to various conditions. In one example, score-keeping machine 630 may be configured to end the golf shot grouping session responsive to a duration of the golf shot grouping session being greater than a duration threshold. For example, if no golf swings are identified for three minutes after a previously identified golf swing, then score-keeping machine 630 may end the golf shot grouping session. In another example, score-keeping machine 630 may be configured to end the golf shot grouping session responsive to a distance between a location of the golf shot and a current location of the golfer being greater than a distance threshold. For example, if the golfer travels more than ten yards from a position of the previously identified golf shot, then score-keeping machine 630 may end the golf shot grouping session. In another example, score-keeping machine 630 may be configured to end the golf shot grouping session responsive to a new hole detection event. For example, a new hole detection event may occur when a position of the golfer is determined to be within a boundary of a next tee box after leaving a previous green. In another example, score-keeping machine 630 may be configured to end the golf shot grouping session responsive to a manual adjustment of the golf score. Score-keeping machine 630 may be configured to end the golf shot grouping session responsive to any suitable condition.

Score-keeping machine 630 may be configured to increment the golf score only once per each golf shot grouping session. By employing the golf shoot grouping session, a likelihood of score-keeping machine 630 inaccurately incrementing the golf score may be reduced.

Distance calculation machine 632 may be configured to determine distances of golf shots performed by the golfer during the round of golf. Distance calculation machine 632 may be configured to determine a golf shot distance by comparing a GPS position of a previously-executed golf shot to a current GPS position of the golfer when a current golf shot is identified by machine-learning golf shot detection machine 620.

Furthermore, distance calculation machine 632 may be configured to determine distances between a current position of the golfer and positions of designated golf course features (e.g., bunker, water hazard, pin, front/middle/back of green). Distance calculation machine 632 may be configured to determine such distances by comparing a current GPS position of the golfer indicated by machine-readable position data 614 to a GPS position of a designated golf course feature. The GPS positions of different golf course features may be provided to wearable computing device 100 from mobile computing device 114 (shown in FIG. 1) as part of a golf course feature map.

In some implementations, distance calculation machine 632 may be configured to determine changes in elevation between a current elevation of the golfer and elevations of designated golf course features. Distance calculation machine 632 may be configured to determine such changes in elevation by comparing a current elevation of the golfer indicated by machine-readable elevation data 618 to an elevation of a designated golf course feature. The elevation of different golf course features may be provided to wearable computing device 100 as part of a golf course map. Further, in some implementations, distance calculation machine 632 may use machine-readable position data 614 and machine-readable elevation data 618 in distance calculations.

Step counting machine 634 may be configured to recognize a step taken by the golfer from machine-readable motion data 612. Moreover, step counting machine 634 may be configured to track a number of steps taken by the golfer over various segments of the golf course. For example, stem counting machine 634 may track a number of steps taken by the golfer on each hole of the golf course during the round of golf, as well as a total number of steps taken by the golfer during the entire round of golf. In some implementations, step counting machine 634 may track a number step taken by the golfer since a previous golf shot, and score-keeping machine 630 may user the number of steps to determine whether or not to end a golf shot grouping session.

Hole progression machine 636 may be configured to automatically track a hole progression of the golfer based on a current GPS position of the golfer relative to GPS positions of different holes of the golf course. The GPS positions of different holes may be provided to wearable computing device 100 as part of a golf course feature map.

In some implementations, hole progression machine 636 may leverage additional information beyond the current GPS position of the golfer to increase a confidence level of a hole progression determination. In one example, hole progression machine 636 compares a current number of total golf shots taken by the golfer with a cumulative shot threshold for the current hole when determining a current hole of the golfer. For example, if a golfer shanks a tee shot on the $1^{st}$ hole and the golf ball lands on an adjacent fairway of the $8^{th}$ hole, hole progression machine 636 may determine that the golfer has not made a minimum number of golf shots necessary to reach the $8^{th}$ hole. Accordingly, hole progression machine 636 may determine that the golfer is still on the first hole. Alternatively, the hole progression machine may only allow golf shots in successive holes. Using the example above, because the last recorded shot was from the $1^{st}$ hole, the hold progression machine would only attribute the shot after a $1^{st}$ hole shot to the $1^{st}$ or $2^{nd}$ holes. In another example, hole progression machine 636 may be configured to track a GPS path of the golfer as part of a hole progression determination. Hole progression machine 636 may track the golfer's hole progression in any suitable manner.

GPS power management machine 638 may be configured to operate GPS sensor 604 between a high power state and a lower power state in an efficient manner so as to reduce power consumption relative to operating GPS sensor 604 in the high power state continuously. In particular, GPS power management machine 638 may be configured to, in response to execution of golf application program 108B, operate GPS sensor 604 in the high power state until GPS sensor 604 acquires a GPS signal (e.g., a hot lock). Subsequent to acquiring the GPS signal, GPS power management machine 638 may control operation of GPS sensor 604 according to a default power state duty cycle.

The default power state duty cycle may be configured to specifically control operation of GPS sensor 604 according to the GPS position needs of the golf application program 108B. In other words, machine-readable position data 614 may not be needed continuously to enable functionality of golf application program 108B. Accordingly, GPS power management machine 638 may be configured to operate GPS sensor 604 in the high power state at a suitable frequency for GPS sensor 604 to maintain a warm lock (e.g., preserve almanac and ephemeris data used to communicate with satellites of a GPS satellite network in local GPS memory). Accordingly, GPS sensor 604 can provide machine-readable position data 614 in a timely manner. In one example, the default power state duty cycle is 33% over a period of 24 seconds. However, the default power state duty cycle may be set to any suitable percentage over any suitable period.

Furthermore, GPS power management machine 638 may be configured to dynamically adjust the power state duty cycle of the GPS sensor responsive to a golf-event interrupt. Wearable computing device 100 may generate a golf-event interrupt responsive to any suitable event in which golf application program 108B uses machine-readable position data 614 provided by GPS sensor 604 to enable functionality of golf application program 108B.

In one example, the golf-event interrupt is generated responsive to a manual user input to the golf assistant computing device. For example, the manual user input may include a golfer-initiated request for a distance between a current position of the golfer and a designated golf course feature (e.g., front/middle/back of green).

In another example, the golf-event interrupt is generated responsive to a device-initiated request. Non-limiting examples of device-initiated requests include a request for distance between a current position of a golfer and a designated golf course feature, a request for a distance between a position at which a previous golf shot was detected and a current position of the golfer, a request for a position request to determine hole progression, and other position requests.

In another example, the golf-event interrupt is generated responsive to machine-learning golf shot detection machine 620 identifying a golf swing. In this example, GPS power management machine 638 may operate GPS sensor 604 in the high power state prior to machine-learning golf shot detection machine 620 identifying a golf shot. Accordingly, GPS sensor 604 may acquire a GPS signal by the time a golf shot is identified, and a GPS position of the golf shot may be accurately tracked. In other words, by turning on the GPS responsive to detection of a golf swing, the GPS sensor may be spooled up with accurate position data when a golf shot is detected.

In another example, the golf-event interrupt is generated responsive to a number of steps taken by the golfer after a last golf shot being greater than a step threshold. In this example, such a number of steps may be tracked by step counting machine 634. The step threshold may be used to trigger the golf-event interrupt, because the condition may indicate that the golfer has walked a sufficient distance to potentially execute another golf shot, and the GPS sensor may be turned on to mark the GPS location of the golf shot.

In the above described examples of golf-event interrupts, GPS power management machine 638 may be configured to dynamically increase the power state duty cycle of the GPS sensor from the default power state duty cycle responsive to the golf-event interrupt. In other words, the GPS power management machine 638 may deviate from the power state duty cycle to keep the GPS sensor turned on in order to provide a GPS position for an impending golf event. In one example, score-keeping machine 630 may be configured to recognize a golf shot grouping session, and GPS power management machine 638 may be configured to operate GPS sensor 604 in the higher power state until the golf shot grouping session ends even if it means deviating from the default power state duty cycle. In the above described examples, GPS power management machine 638 deviates from the default power state duty cycle to maintain GPS sensor 604 in the high power state. In some cases, GPS power management machine 638 may deviate from the default power state duty cycle to maintain GPS sensor 604 in the lower power state.

In some cases, GPS sensor 604 may provide relatively inaccurate GPS position data, although GPS sensor 604 may indicate that it has a signal lock. Accordingly, in some implementations, GPS power management machine 638 may be configured to selectively use machine-readable position data 614 based on a level of stability of position data 614. In one example, GPS power management machine 638 evaluates an error value (e.g., an estimated horizontal positional error) of position data 614 to determine whether position data 614 is stable/accurate. In particular, GPS power management machine 638 may be configured to compare a rate of change of the error value to a threshold value from cycle to cycle. If the rate of change is less than the threshold value, GPS power management machine 638 may determine that position data 614 is accurate, and GPS power management machine 638 may allow position data 614 to be used by components of wearable computing device 100. On the other hand, if the rate of change of the error value is greater than the threshold value, then GPS power management machine 638 may prevent components of wearable computing device 100 from using position data 614 until position data 614 is determined to be accurate.

Figure 7:
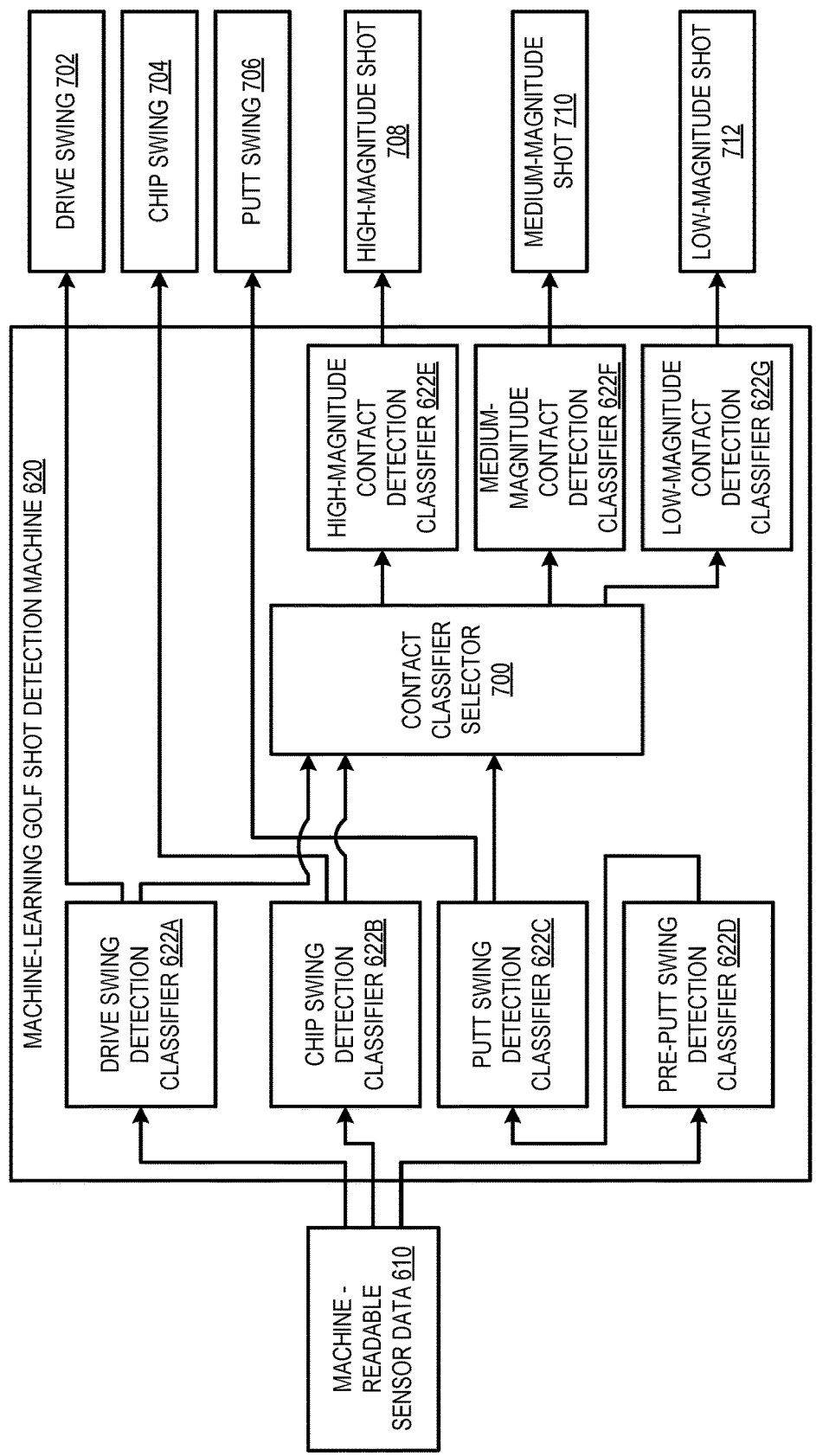
FIG. 7 schematically shows an example machine-learning golf shot detection machine implemented in a wearable computing device.

FIG. 7 shows an example hierarchy of classifiers 624 included in machine-learning golf shot detection machine 620. In the illustrated example, the classifiers 624 are neural networks. In particular, machine-learning golf shot detection machine 620 includes a plurality of different swing detection classifiers and a plurality of different contact detection classifiers. Each swing detection classifier may be configured to identify a different type of golf swing.

Each contact detection classifier may be configured to identify whether a golf shot resulted from an identified golf swing having a swing magnitude within a specified range. In this example hierarchy, the plurality of different swing detection classifiers may be executed in parallel to identify a golf swing. If any swing detection classifier identifies a golf swing, then a contact classifier selector 700 of machine-learning golf shot detection machine 620 may determine a magnitude metric for the golf swing. Contact classifier selector 700 uses the magnitude metric to select one of the contact detection classifiers to be executed to identify whether the golf swing is a golf shot. In one example, the magnitude metric is a greatest magnitude of angular acceleration data samples windowed around a crossing of a gyroscope. In particular, contact classifier selector 700 determines whether an identified golf swing has a high swing magnitude, a medium swing magnitude, or a low swing magnitude. The thresholds for the high swing magnitude, medium swing magnitude, and low swing magnitude may be set to any suitable thresholds. Although contact classifier selector 700 selects a particular contact detection classifier based on a swing magnitude metric in this example, contact classifier selector 700 may select a contact detection classifier based on any suitable sensor parameter of wearable computing device 100 without departing from the scope of the present disclosure. In another example, contact classifier selector 700 may select a contact classifier based on an audio signature of an identified swing.

In the illustrated implementation, machine-learning golf shot detection machine 620 includes a drive swing detection classifier 622A, a chip swing detection classifier 622B, a putt swing detection classifier 622C, a pre-putt swing detection classifier 622D, a high-magnitude contact detection classifier 622E, a medium-magnitude contact detection classifier 622F, and a low-magnitude contact detection classifier 622G. Each of these classifiers include features related to accelerometer and/or gyroscope data samples or discrete-time signals. The accelerometer data samples represent linear acceleration given in terms of Gs. The gyroscope data samples represent angular acceleration around a particular axis given in degrees per second. FIG. 1 shows an example position of the X, Y, and Z axes relative to wearable computing device 100. Furthermore, an arrow corresponding to a direction of positive rotation of each gyroscope is shown on each of the X, Y, and Z axes.

Drive swing detection classifier 622A is previously trained with training motion data of previously-executed drive swings. Drive swing detection classifier 622A is configured to identify a drive swing from machine-readable motion data windowed around crossings between negative and positive angular acceleration of each of two gyroscopes. In one example, features of drive swing detection classifier 622A are created from machine-readable sensor data 610 within a fixed time window. In one example, the sensor data is sampled at an interval of 16 milliseconds to produce 113 sensor data samples in a time window centered on a time at which the crossings of the two gyroscopes occur. In one example, the features of drive swing detection classifier 622A include a difference of accelerometer data samples along the Z axis within the time window; a difference of gyroscope data samples along the X axis within the time window; a difference of gyroscope data samples along the Y axis within the time window; a difference of gyroscope data samples along the Z axis within the time window, as well as raw acceleration data samples corresponding to the Z axis and raw gyroscope data samples corresponding to the X, Y, and Z axes. As an example, the difference may be defined as $y1[n]=x[n]-x[n-1]$, where x represents the particular data sample value and n represents the discrete time at which the data sample is taken. Each of the above described data samples are down-sampled in time by 4. In response to drive swing detection classifier 622A identifying a drive swing, machine-learning golf shot detection machine 620 outputs an indication 702 of identifying a drive swing.

Chip swing detection classifier 622B is previously trained with training motion data of previously-executed chip swings. Chip swing detection classifier 622B is configured to identify a chip swing from machine-readable motion data windowed around crossings between negative and positive angular acceleration of each of two gyroscopes. In one example, features of chip swing detection classifier 622B are created from machine-readable sensor data 610 within a fixed time window. In one example, the sensor data is sampled at an interval of 16 milliseconds to produce 113 sensor data samples in a time window centered on a time at which the crossings of the two gyroscopes occur. In one example, the features of chip swing detection classifier 622B may be the same as the features of drive swing detection classifier 622B. In response to chip swing detection classifier 622B identifying a chip swing, machine-learning golf shot detection machine 620 outputs an indication 704 of identifying a chip swing.

Pre-putt swing detection classifier 622D has a low threshold for identifying potential putt swings, and is executed prior to putt swing detection classifier 622C in order to eliminate false detections of putts. In other words, putt swing detection classifier 622C is not executed unless pre-putt swing detection classifier 622D identifies a potential putt. Pre-putt swing detection classifier 622D may be substantially less complex than putt swing detection classifier 622C, and thus may reduce processing resources consumed to analyze whether a putt swing has occurred.

Pre-putt swing detection classifier 622D is configured to identify a potential putt swing from machine-readable motion data windowed around at least one crossing between negative and positive angular acceleration of at least one gyroscope. In one example, features of pre-putt swing detection classifier 622D are created from machine-readable sensor data 610 within a fixed time window. In one example, the sensor data is sampled at an interval of 16 milliseconds to produce 53 sensor data samples in a time window centered on a time at which the crossing of the gyroscope occurs. In one example, the features of pre-putt swing detection classifier 622D include a sum of the absolute value of a first half (left of center before the crossing occurs) of the gyroscope data samples (one sum for each axis); a sum of the absolute value of a second half (right of center after the crossing occurs) of the gyroscope data samples (one sum for each axis); a variance of the second-order difference of the first half of the gyroscope data samples; a variance of the second-order difference of the second half of the gyroscope data samples; a mean of all accelerometer data samples in the time window (one value per axis); and a variance of all accelerometer data samples in the time window (one value per axis). The second-order difference may be defined as $y2[n]=(f[n]-f[n-1])-(f[n-1]-f[n-2])=x[n]-2*f[n-1]+f[n-2]=y1[n]-y1[n-1]$, where the signal "f" represents any one axis of gyroscope or accelerometer data, where x represents the particular data sample value and n represents the discrete time at which the data sample is taken.

Putt swing detection classifier 622C is previously trained with training motion data of previously-executed putt swings. Putt swing detection classifier 622C is configured to identify a putt swing from machine-readable motion data windowed around at least one crossing between negative and positive angular acceleration of at least one gyroscope. In one example, features of putt swing detection classifier 622C are created from machine-readable sensor data 610 within a fixed time window. In one example, the sensor data is sampled at an interval of 16 milliseconds to produce 105 sensor data samples in a time window centered on a time at which the crossing of the gyroscope occurs. In one example, the features of putt swing detection classifier 622C include all of the features of pre-putt swing detection classifier 622D, as well as raw accelerometer data samples along the X, Y, and Z axes—down sampled in time by 4 (separately for each signal); raw gyroscope data samples along the X and Z axes—down sampled in time by 2 (separately for each signal); raw gyroscope along the Y axis—not down sampled in time; the sign for gyroscope data samples along the X, Y, and Z axes—down sampled in time by 2 (separately for each signal); a sample-by-sample Boolean comparison of gyroscope data samples along the X axis being less than gyroscope data samples along the Y axis—down sampled in time by 4 (separately for each signal); a sample-by-sample Boolean comparison of gyroscope data samples along the Z axis being less than gyroscope data samples along the Y axis—down sampled in time by 4 (separately for each signal); a variance of data samples over the full time window for each axis of the accelerometers and the gyroscopes; a maximum of the gyroscope signals (e.g., pitch, roll, yaw) over the full time window; and a minimum of the gyroscope signals over the full time window. In response to putt swing detection classifier 622C identifying a putt swing, machine-learning golf shot detection machine 620 outputs an indication 706 of identifying a putt swing.

High-magnitude contact detection classifier 622E is previously trained with training motion data of previously-executed high-magnitude swings that contact a golf ball as well as high-magnitude swings that do not contact a golf ball. High-magnitude contact detection classifier 622E is configured to identify contact between a golf club held by the golfer and a golf ball during a high-magnitude swing. High-magnitude contact detection classifier 622E is configured to identify contact from machine-readable motion data windowed around crossings between negative and positive angular acceleration of each of two gyroscopes. In one example, features of high-magnitude contact detection classifier 622E are created from machine-readable sensor data 610 within a fixed time window. In one example, the sensor data is sampled at an interval of 16 milliseconds to produce 40 sensor data samples in a time window extending right of center on a time at which the crossings of the two gyroscopes occur. The time window corresponds to the forward swing motion of the golfer during the swing. In one example, the features of high-magnitude contact detection classifier 622E include a maximum 4 values for each accelerometer signal (e.g., X, Y, Z) of the absolute value of the difference of data samples in the time window; a maximum 3 values for each accelerometer signal of the absolute value of the second-order difference of data samples in the time window; a maximum 3 values for each gyroscope signal (e.g., pitch, roll, yaw) of the absolute value of the difference of data samples in the time window; a maximum absolute value for each gyroscope signal; and a maximum absolute value for each accelerometer signal. In some implementations, high-magnitude contact detection classifier 622E may be configured to identify contact from machine-readable audio data windowed around crossings between negative and positive angular acceleration of each of two gyroscopes. For example, high-magnitude contact detection classifier 622E may include features based on an audio signature of a golf swing or contact between a golf club and a golf ball. In response to high-magnitude contact detection classifier 622E identifying a high-magnitude shot, machine-learning golf shot detection machine 620 outputs an indication 708 of identifying a high-magnitude shot.

Medium-magnitude contact detection classifier 622F is previously trained with training motion data of previously-executed medium-magnitude swings that contact a golf ball as well as medium-magnitude swing that do not contact a golf ball. Medium-magnitude contact detection classifier 622F is configured to identify contact between a golf club held by the golfer and a golf ball during a medium-magnitude swing. Medium-magnitude contact detection classifier 622F is configured to identify contact from machine-readable motion data windowed around crossings between negative and positive angular acceleration of each of two gyroscopes. In one example, features of medium-magnitude contact detection classifier 622F are created from machine-readable sensor data 610 within a fixed time window. In one example, the sensor data is sampled at an interval of 16 milliseconds to produce 40 sensor data samples in a time window extending right of center on a time at which the crossings of the two gyroscopes occur. The time window corresponds to the forward swing motion of the golfer during the swing. In one example, the features of medium-magnitude contact detection classifier 622F include a maximum 4 values for each accelerometer signal (e.g., X, Y, Z) of the absolute value of the difference of data samples in the time window; a maximum 3 values for each gyroscope signal (e.g., pitch, roll, yaw) of the absolute value of the difference of data samples in the time window; and a maximum absolute value for each gyroscope signal. In some implementations, medium-magnitude contact detection classifier 622F may be configured to identify contact from machine-readable audio data windowed around crossings between negative and positive angular acceleration of each of two gyroscopes. For example, medium-magnitude contact detection classifier 622F may include features based on an audio signature of a golf swing or contact between a golf club and a golf ball. In response to medium-magnitude contact detection classifier 622F identifying a medium-magnitude shot, machine-learning golf shot detection machine 620 outputs an indication 710 of identifying a medium-magnitude golf shot.

Low-magnitude contact detection classifier 622G is previously trained with training motion data of previously-executed low-magnitude swings that contact a golf ball as well as low-magnitude swings that do not contact a golf ball. Low-magnitude contact detection classifier 622G is configured to identify contact between a golf club held by the golfer and a golf ball during a low-magnitude swing (or another type of swing based on selection by contact classifier selector 700). Low-magnitude contact detection classifier 622G is configured to identify contact from machine-readable motion data windowed around at least one crossing between negative and positive angular acceleration of at least one gyroscope. In one example, features of low-magnitude contact detection classifier 622G are created from machine-readable sensor data 610 within a fixed time window. In one example, the sensor data is sampled at an interval of 16 milliseconds to produce 35 sensor data samples in a time window extending right of center on a time at which the crossings of the gyroscope occurs. The time window corresponds to the forward swing motion of the golfer during the swing. In one example, the features of low-magnitude contact detection classifier 622G include a maximum of the absolute value of the difference of data samples in the time window for each accelerometer signal (e.g., X, Y, Z); and a maximum of the absolute value of the difference of data samples in the time window for each accelerometer signal divided by a maximum absolute value of all gyroscope signals. In some implementations, low-magnitude contact detection classifier 622G may be configured to identify contact from machine-readable audio data windowed around crossings between negative and positive angular acceleration of each of two gyroscopes. For example, low-magnitude contact detection classifier 622G may include features based on an audio signature of a golf swing or contact between a golf club and a golf ball. In response to low-magnitude contact detection classifier 622G identifying a low-magnitude shot, machine-learning golf shot detection machine 620 outputs an indication 712 of identifying a low-magnitude golf shot.

Although machine-learning golf shot detection machine 620 is described as including classifiers in the form of neural networks, machine-learning golf shot detection machine 620 may employ any suitable machine-learning approach, such as convolutional neural networks, deep neural networks, boosted decision trees, bootstrap aggregating, bagging, and other machine-learning approaches. Moreover, in some implementations, golf shot detection machine 620 may be configured to identify golf swings and golf shots without employing machine learning. In some implementations, the golf shot detection machine may be implemented as one or more circuits.

Figure 8:
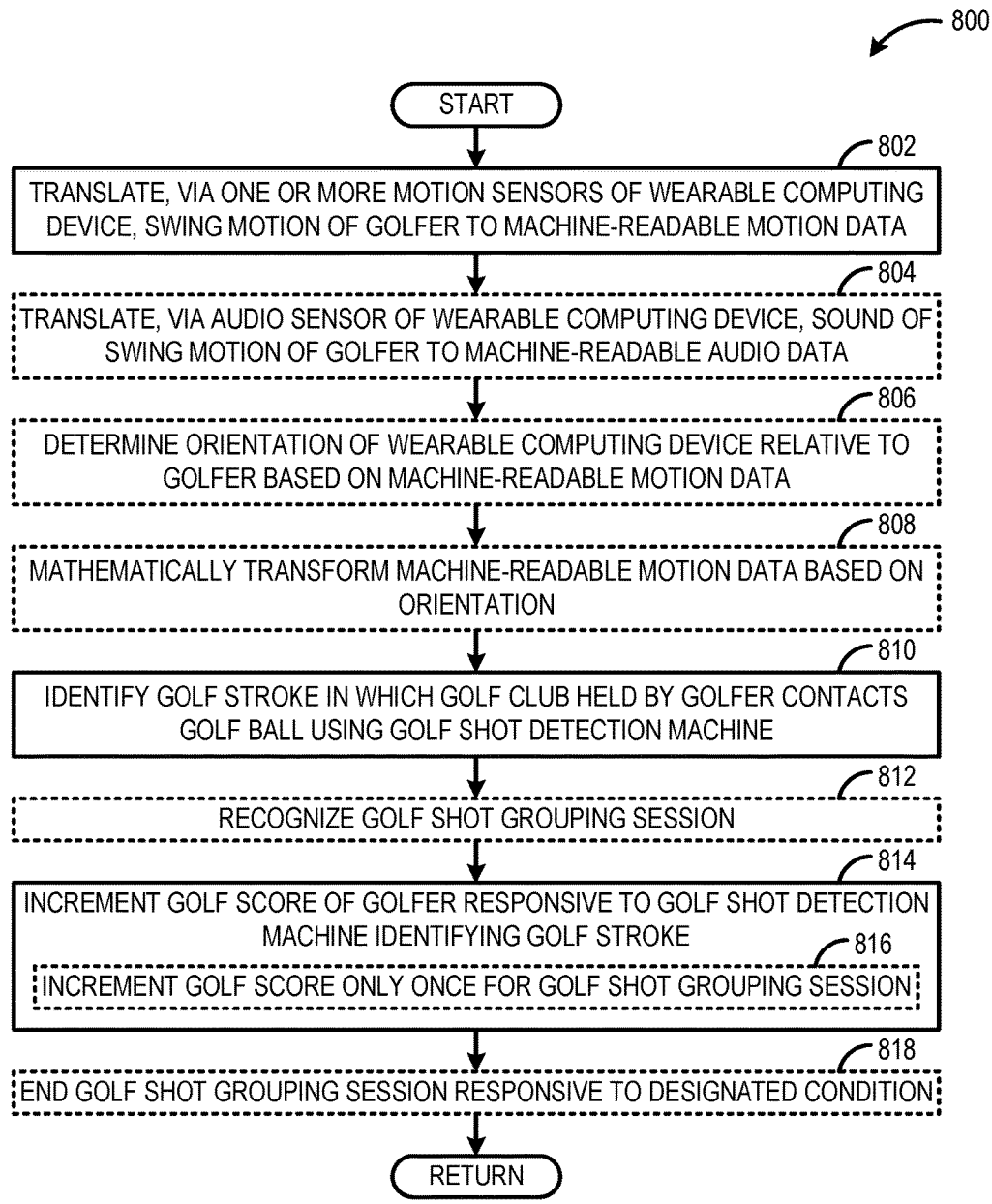
FIG. 8 shows an example method executed by a wearable computing device for automatically keeping track of a golfer's golf score.

FIG. 8 shows an example method 800 for automatically keeping track of a golf score of a golfer wearing a wearable computing device. For example, the method 800 may be performed by wearable computing device 100 shown in FIG. 1 or computing system 1000 shown in FIG. 10.

At 802, method 800 includes translating, via one or more motion sensors of the wearable computing device, swing motion of the golfer to machine-readable motion data. In one example, the one or more motion sensors include one or more accelerometers and one or more gyroscopes.

In some implementations, at 804, method 800 optionally may include translating, via one or more audio sensors of the wearable computing device, sound of swing motion of the golfer to machine-readable audio data.

In some implementations, at 806, method 800 optionally may include determining an orientation of the wearable computing device relative to the golfer based on the machine-readable motion data. In one example, orientation detection machine 628 (shown in FIG. 6) determines the orientation of the wearable computing device. The orientation may be determined automatically by orientation detection machine 628 or manually via user input to the wearable computing device.

In implementations where the orientation of the wearable computing device is determined, at 808, method 800 optionally may include mathematically transforming machine-readable motion data based on the determined orientation. In one example, orientation detection machine 628 (shown in FIG. 6) transforms the motion data. The motion data may be transformed in this manner so that the motion data appears the same to machine-learning golf shot detection machine 620 (shown in FIG. 6) regardless of the orientation of the wearable computing device.

At 810, method 800 includes identifying a golf shot in which a golf club held by the golfer contacts a golf ball from the machine-readable motion data using a machine-learning golf shot detection machine 620. In implementations where machine-readable audio data is provided by the one or more audio sensors, method 800 may include identifying a golf shot in which a golf club held by the golfer contacts a golf ball from the machine-readable audio data using the machine-learning golf shot detection machine 620. In some implementations, the golf shot may be identified from the machine-readable motion data and the machine-readable audio data using the machine-learning golf shot detection machine 620.

In some implementations, at 812, method 800 optionally may include recognizing a golf shot grouping session. In one example, the golf shot grouping session is recognized by score-keeping machine 630 (shown in FIG. 6).

At 814, method 800 includes incrementing a golf score of the golfer responsive to the machine-learning golf shot detection machine identifying the golf shot. In implementations where the golf shot grouping session is recognized, at 816, the method optionally may include incrementing the golf score only once for each golf shot grouping session.

In implementations where the golf shot grouping session is recognized, at 818, method 800 optionally may include ending the golf shot grouping session responsive to a designated condition. In one example, the golf shot grouping session is ended by score-keeping machine 630 (shown in FIG. 6).

Figure 9:
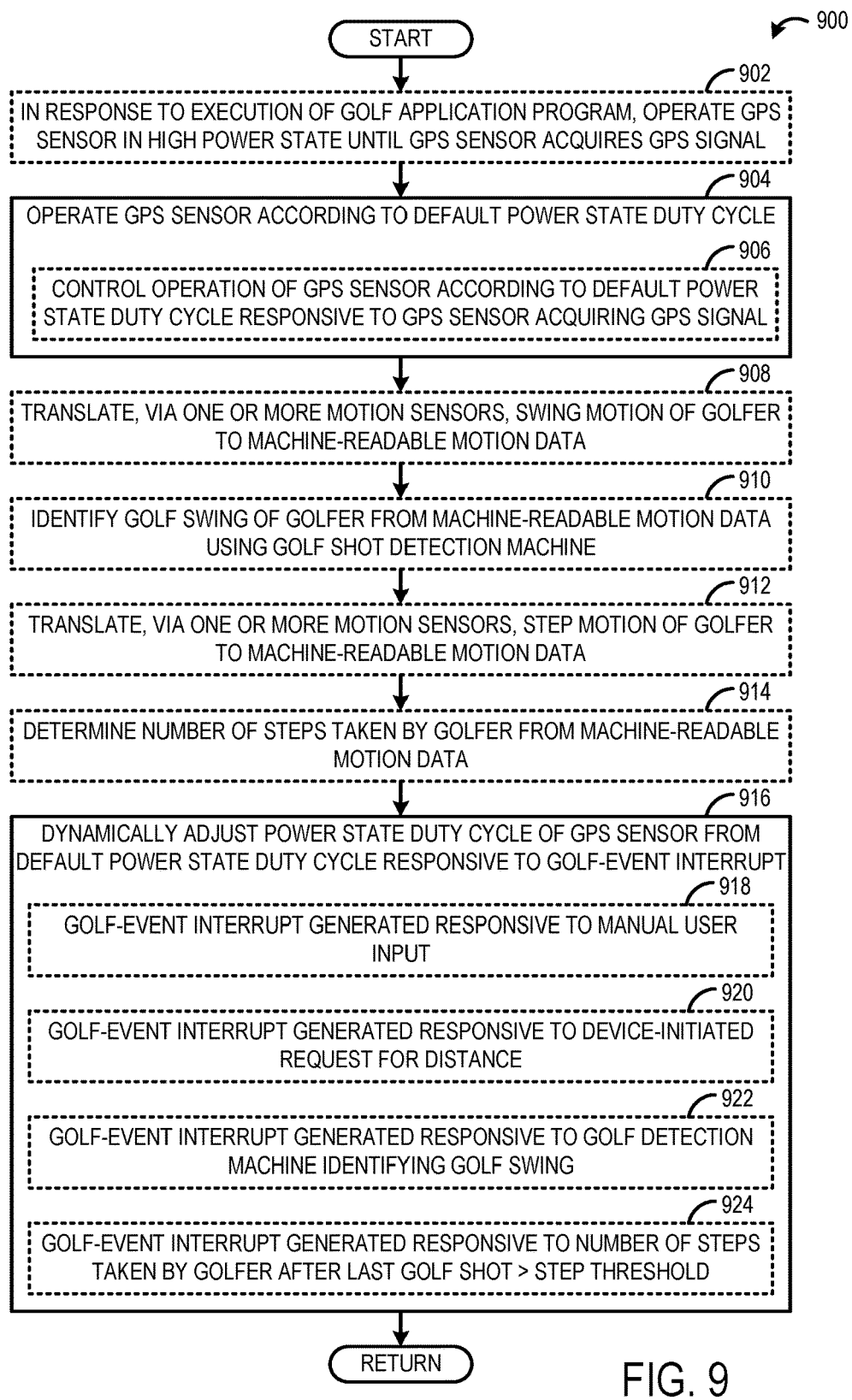
FIG. 9 shows an example method executed by a wearable computing device for controlling operation of a global positioning system (GPS) sensor of a wearable computing device.

FIG. 9 shows an example method 900 for controlling operation of a GPS sensor of a golf assistant computing device. For example, the method 900 may be performed by wearable computing device 100 shown in FIG. 1 or computing system 1000 shown in FIG. 10.

In some implementations, at 902, method 900 optionally may include, in response to execution of a golf application program on the golf assistant computing device, operating the GPS sensor in a high power state until the GPS sensor acquires a GPS signal.

At 904, method 900 includes operating the GPS sensor according to a default power state duty cycle. The default power state duty cycle defines a percentage of a period in which the GPS sensor operates in the high power state relative to the lower power state. In one example, the default power state duty cycle is 33% over a period of 24 seconds. However, the default power state duty cycle may be set to any suitable percentage over any suitable period. In one example, GPS power management machine 638 shown in FIG. 6 controls the GPS sensor according to the default power state duty cycle.

In implementations, where the GPS sensor is operated in the high power state until the GPS sensor acquires a GPS signal, at 906, method 900 optionally may include, in response to the GPS sensor acquiring the GPS signal, controlling operation of the GPS sensor according to the default power state duty cycle.

In some implementations, at 908, method 900 optionally may include translating, via one or more motion sensors of the golf assistant computing device, step motion of a golfer to machine-readable motion data.

In some implementations, at 910, method 900 optionally may include identifying a golf swing of the golfer from the machine-readable motion data using a golf shot detection machine. In one example machine-learning golf shot detection machine 620 shown in FIG. 6 identifies the golf swing.

In some implementations, at 912, method 900 optionally may include translating, via one or more motion sensors of the golf assistant computing device, step motion of a golfer to machine-readable motion data.

In some implementations, at 914, method 900 optionally may include determine a number of steps taken by the golfer from the machine-readable motion data. In one example, step counting machine 634 shown in FIG. 6 determines the number of steps.

At 916, method 900 includes dynamically adjusting the power state duty cycle of the GPS sensor from the default power state duty cycle responsive to a golf-event interrupt. In one example, GPS power management machine 638 shown in FIG. 6 controls the GPS sensor to dynamically adjusts the power state duty cycle. The power state duty cycle may be adjusted responsive to any suitable golf-event interrupt. In some implementations, at 918, the golf-event interrupt is generated responsive to manual user input. In some implementations, at 920, the golf-event interrupt is generated responsive to a device-initiated request for a distance. In some implementations, at 922, the golf-event interrupt is generated responsive to the golf detection machine identifying the golf swing. In some implementations, at 924, the golf-event interrupt is generated responsive to a number of steps taken by the golfer after the last golf shot being greater than a step threshold.

In some implementations, the methods and processes described herein may be tied to a computing system of one or more computing devices. In particular, such methods and processes may be implemented as a computer-application program or service, an application-programming interface (API), a library, and/or other computer-program product.

Figure 10:
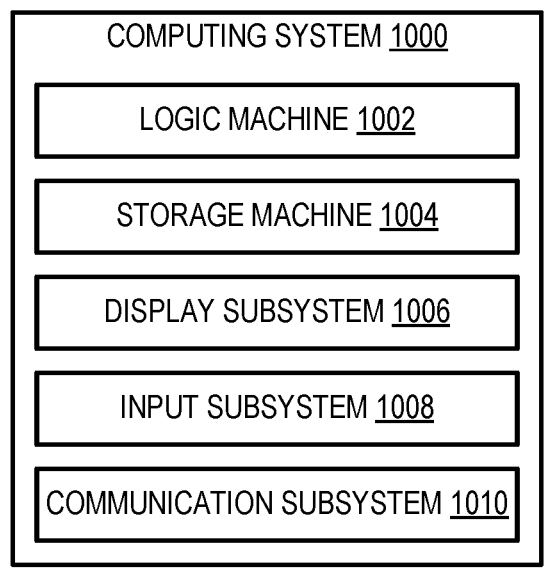
FIG. 10 shows an example computing system.

FIG. 10 schematically shows a non-limiting implementation of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), and/or other computing devices. Computing system 1000 may represent wearable computing device 100 shown in FIG. 1.

Computing system 1000 includes a logic machine 1002 and a storage machine 1004. Computing system 1000 optionally may include a display subsystem 1006, input subsystem 1008, communication subsystem 1010, and/or other components not shown in FIG. 10.

Logic machine 1002 includes one or more physical devices configured to execute instructions. For example, logic machine 1002 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 1002 may include one or more processors configured to execute software instructions. Additionally or alternatively, logic machine 1002 may include one or more hardware or firmware logic machines configured to execute hardware or firmware instructions. Processors of logic machine 1002 may be single-core or multi-core, and the instructions executed thereon may be configured for sequential, parallel, and/or distributed processing. Individual components of logic machine 1002 optionally may be distributed among two or more separate devices, which may be remotely located and/or configured for coordinated processing. Aspects of logic machine 1002 may be virtualized and executed by remotely accessible, networked computing devices configured in a cloud-computing configuration.

Storage machine 1004 includes one or more physical devices configured to hold instructions executable by logic machine to implement the methods and processes described herein. When such methods and processes are implemented, the state of storage machine 1004 may be transformed—e.g., to hold different data.

Storage machine 1004 may include removable and/or built-in devices. Storage machine 1004 may include optical memory (e.g., CD, DVD, HD-DVD, and Blu-Ray Disc), semiconductor memory (e.g., RAM, EPROM, and EEPROM), and/or magnetic memory (e.g., hard-disk drive, floppy-disk drive, tape drive, and MRAM), among others. Storage machine 1004 may include volatile, nonvolatile, dynamic, static, read/write, read-only, random-access, sequential-access, location-addressable, file-addressable, and/or content-addressable devices.

It will be appreciated that storage machine 1004 includes one or more physical devices. However, aspects of the instructions described herein alternatively may be propagated by a communication medium (e.g., an electromagnetic signal and an optical signal) that is not held by a physical device for a finite duration.

Aspects of logic machine 1002 and storage machine 1004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, machine-learning golf shot detection machine 620, crossing detection machine 626, orientation detection machine 628, score-keeping machine 630, distance calculation machine 632, step counting machine 634, hole progression machine 636, and GPS power management machine 638 may be implemented as the same or different logic machines as described above. In some implementations, one or more of the machines may be implemented as one or more circuits.

It will be appreciated that a "service", as used herein, is an application program executable across multiple user sessions. A service may be available to one or more system components, programs, and/or other services. In some implementations, a service may run on one or more server-computing devices.

When included, display subsystem 1006 may be used to present a visual representation of data held by storage machine 1004. This visual representation may take the form of a graphical user interface (GUI). As the herein described methods and processes change the data held by the storage machine 1004, and thus transform the state of the storage machine 1004, the state of display subsystem 1006 may likewise be transformed to visually represent changes in the underlying data. Display subsystem 1006 may include one or more display devices utilizing virtually any type of technology. Such display devices may be combined with logic machine 1002 and/or storage machine 1004 in a shared enclosure, or such display devices may be peripheral display devices.

When included, input subsystem 1008 may comprise or interface with one or more user-input devices such as a keyboard, mouse, touch screen, or game controller. In some implementations, input subsystem 1008 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1010 may be configured to communicatively couple computing system 1000 with one or more other computing devices. Communication subsystem 1010 may include wired and/or wireless communication devices compatible with one or more different communication protocols. As non-limiting examples, communication subsystem 1010 may be configured for communication via a wireless telephone network, or a wired or wireless local- or wide-area network. In some embodiments, the communication subsystem may allow computing system 1000 to send and/or receive messages to and/or from other devices via a network such as the Internet.

Additional aspects of the present disclosure are described below. According to one aspect, a wearable computing device, comprises one or more motion sensors configured to measure swing motion, a first circuit in communication with the one or more motion sensors, the first circuit being configured to translate measurements of swing motion to machine-readable motion data and identify from the machine-readable motion data a golf shot in which a golf club held by a golfer contacts a golf ball, the second circuit previously trained, via machine learning, with training motion data of previously-executed golf swings, and a second circuit configured to increment a golf score of the golfer responsive to the golf shot being identified. In this aspect, the first circuit may include a plurality of different swing detection classifiers, each configured to identify a different type of golf swing. In this aspect, the first circuit may include a plurality of different contact detection classifiers, each configured to identify contact of the golf club on the golf ball. In this aspect, the first circuit may be configured to select one of the plurality of different contact detection classifiers based on a swing magnitude metric measured by the one or more motion sensors. In this aspect, the swing magnitude metric may correspond to a maximum angular acceleration identified from machine-readable motion data windowed around crossings between negative and positive angular accelerations measured by the one or more motion sensors. In this aspect, the one or more motion sensors may include at least a first gyroscope configured to measure angular acceleration about a first axis and a second gyroscope configured to measure angular acceleration about a second axis perpendicular to the first axis. The plurality of different swing detection classifiers may include a drive swing detection classifier previously trained with training motion data of previously-executed drive swings. The drive swing detection classifier may be configured to identify a drive swing from machine-readable motion data windowed around crossings between negative and positive angular acceleration of each of the first and second gyroscopes. In this aspect, the one or more motion sensors may include at least a first gyroscope configured to measure angular acceleration about a first axis and a second gyroscope configured to measure angular acceleration about a second axis perpendicular to the first axis. The plurality of different swing detection classifiers may include a chip swing detection classifier previously trained with training motion data of previously-executed chip swings. The chip swing detection classifier may be configured to identify a chip swing from machine-readable motion data windowed around crossings between negative and positive angular acceleration of each of the first and second gyroscopes. In this aspect, the one or more motion sensors may include at least a first gyroscope configured to measure angular acceleration about a first axis. The plurality of different swing detection classifiers may include a putt swing detection classifier previously trained with training motion data of previously-executed putt swings. The putt swing detection classifier may be configured to identify a putt swing from machine-readable motion data windowed around a crossing between negative and positive angular acceleration of the first gyroscope. In this aspect, the first circuit may be configured to recognize a golf shot grouping session and increment the golf score only once for the golf shot grouping session. In this aspect, the first circuit may be configured to end the golf shot grouping session responsive to a duration of the golf shot grouping session being greater than a duration threshold. In this aspect, the first circuit may be configured to end the golf shot grouping session responsive to a distance between a location of the golf shot and a current location of the golfer being greater than a distance threshold. In this aspect, the first circuit may be configured to end the golf shot grouping session responsive to a new hole detection event. In this aspect, the first circuit may be configured to end the golf shot grouping session responsive to a manual adjustment of the golf score. In this aspect, the wearable computing device may further comprise an audio sensor configured to measure sound of the swing motion. The first circuit may be configured to translate measurements of sound of the swing motion to machine-readable audio data. The first circuit may be configured to identify at least from the machine-readable audio data the golf shot, the first circuit previously trained, via machine learning, with training audio data of previously-executed golf swings. In this aspect, the wearable computing device may include a wrist band configured to be worn in a plurality of different orientations on wrists of the golfer. The first circuit may be configured to determine an orientation of the wearable computing device relative to a wrist of the golfer based on the machine-readable motion data.

According to another aspect, a method comprises translating, via one or more motion sensors, swing motion to machine-readable motion data, identifying a golf shot in which a golf club held by a golfer contacts a golf ball from the machine-readable motion data using a circuit previously trained, via machine learning, with training motion data of previously-executed golf swings, and incrementing a golf score of the golfer responsive to the golf shot being identified.

According to another aspect, a wrist-worn computing device, comprises a wrist band, a wearable computing device attached to the wrist band and a display. The computing devices includes one or more motion sensors configured to measure swing motion, a first circuit in communication with the one or more motion sensors, and a second circuit. The first circuit is configured to translate measurements of swing motion to machine-readable motion data and identify from the machine-readable motion data a golf shot in which a golf club held by a golfer contacts a golf ball. The second circuit configured to increment a golf score of the golfer responsive to the golf shot being identified. The display is configured to visually present the golf score. In this aspect, the first circuit may be previously trained, via machine learning, with training motion data of previously-executed golf swings. In this aspect, the first circuit may be configured to recognize a golf shot grouping session and increment the golf score only once for the golf shot grouping session. In this aspect, the first circuit and the second circuit may be implemented on a same integrated circuit.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A wearable computing device, comprising:
   one or more motion sensors configured to measure swing motion;
   a band to mount at least the one or more sensors to a golfer;
   a first circuit in communication with the one or more motion sensors, the first circuit being configured to translate measurements of swing motion to motion data and identify, from the motion data, a golf shot in which a golf club held by the golfer contacts a golf ball, the first circuit previously trained, via machine learning, with training motion data of previously-executed golf shots contacting golf balls and practice swings not contacting golf balls, to distinguish golf shots from practice swings, and
   a second circuit configured to increment a golf score of the golfer responsive to the golf shot being identified and maintain a golf score of the golfer responsive to a practice swing being identified.

2. The wearable computing device of claim 1, wherein the first circuit includes a plurality of different swing detection classifiers, each configured to identify a different type of golf swing.

3. The wearable computing device of claim 2, wherein the first circuit includes a plurality of different contact detection classifiers, each configured to identify contact of the golf club on the golf ball.

4. The wearable computing device of claim 3, wherein the first circuit is configured to select one of the plurality of different contact detection classifiers based on a swing magnitude metric measured by the one or more motion sensors.

5. The wearable computing device of claim 4, wherein the swing magnitude metric corresponds to a maximum angular acceleration identified from motion data windowed around crossings between negative and positive angular accelerations measured by the one or more motion sensors.

6. The wearable computing device of claim 2, wherein the one or more motion sensors include at least a first gyroscope configured to measure angular acceleration about a first axis and a second gyroscope configured to measure angular acceleration about a second axis perpendicular to the first axis; wherein the plurality of different swing detection classifiers includes a drive swing detection classifier previously trained with training motion data of previously-executed drive swings; and wherein the drive swing detection classifier is configured to identify a drive swing from motion data windowed around crossings between negative and positive angular acceleration of each of the first and second gyroscopes.

7. The wearable computing device of claim 2, wherein the one or more motion sensors include at least a first gyroscope configured to measure angular acceleration about a first axis and a second gyroscope configured to measure angular acceleration about a second axis perpendicular to the first axis; wherein the plurality of different swing detection classifiers includes a chip swing detection classifier previously trained with training motion data of previously-executed chip swings; and wherein the chip swing detection classifier is configured to identify a chip swing from motion data windowed around crossings between negative and positive angular acceleration of each of the first and second gyroscopes.

8. The wearable computing device of claim 2, wherein the one or more motion sensors include at least a first gyroscope configured to measure angular acceleration about a first axis; wherein the plurality of different swing detection classifiers includes a putt swing detection classifier previously trained with training motion data of previously-executed putt swings; and wherein the putt swing detection classifier is configured to identify a putt swing from motion data windowed around a crossing between negative and positive angular acceleration of the first gyroscope.

9. The wearable computing device of claim 1, wherein the first circuit is configured to recognize a golf shot grouping session and increment the golf score only once for the golf shot grouping session.

10. The wearable computing device of claim 9, wherein the first circuit is configured to end the golf shot grouping session responsive to a duration of the golf shot grouping session being greater than a duration threshold.

11. The wearable computing device of claim 9, wherein the first circuit is configured to end the golf shot grouping session responsive to a distance between a location of the golf shot and a current location of the golfer being greater than a distance threshold.

12. The wearable computing device of claim 9, wherein the first circuit is configured to end the golf shot grouping session responsive to a new hole detection event.

13. The wearable computing device of claim 9, wherein the first circuit is configured to end the golf shot grouping session responsive to a manual adjustment of the golf score.

14. The wearable computing device of claim 1, further comprising:
- an audio sensor configured to measure sound of the swing motion, wherein the first circuit is configured to translate measurements of sound of the swing motion to audio data, and wherein the first circuit is configured to identify at least from the audio data the golf shot, the first circuit previously trained, via machine learning, with training audio data of previously-executed golf swings.

15. The wearable computing device of claim 1, wherein the band is a wrist band configured to be worn in a plurality of different orientations on wrists of the golfer, and wherein the first circuit is configured to determine an orientation of the wearable computing device relative to a wrist of the golfer based on the motion data.

16. A method comprising:
- translating, via one or more motion sensors mounted to a golfer via a band, swing motion to motion data;
- identifying a golf shot in which a golf club held by the golfer contacts a golf ball from the motion data using a circuit previously trained, via machine learning, with training motion data of previously-executed golf shots contacting golf balls and practice swings not contacting golf balls, to distinguish golf shots from practice swings;
- incrementing a golf score of the golfer responsive to the golf shot being identified; and
- maintaining a golf score of the golfer responsive to a practice swing being identified.

17. A wrist-worn computing device, comprising:
- a wrist band;
- a wearable computing device attached to the wrist band and including:
  - one or more motion sensors configured to measure swing motion;
  - a first circuit in communication with the one or more motion sensors, the first circuit being configured to translate measurements of swing motion to motion data, identify from the motion data a golf shot in which a golf club held by a golfer contacts a golf ball, and distinguish the golf shot from a practice swing that does not contact the golf ball;
  - a second circuit configured to increment a golf score of the golfer responsive to the golf shot being identified and maintain a golf score of the golfer responsive to a practice swing being identified; and
  - a display configured to visually present the golf score.

18. The wrist-worn computing device of claim 17, wherein the first circuit is previously trained, via machine learning, with training motion data of previously-executed golf swings.

19. The wrist-worn computing device of claim 17, wherein the first circuit is configured to recognize a golf shot grouping session and increment the golf score only once for the golf shot grouping session.

20. The wrist-worn computing device of claim 17, wherein the first circuit and the second circuit are implemented on a same integrated circuit.

\* \* \* \* \*